United States Patent Office 3,581,340
Patented June 1, 1971

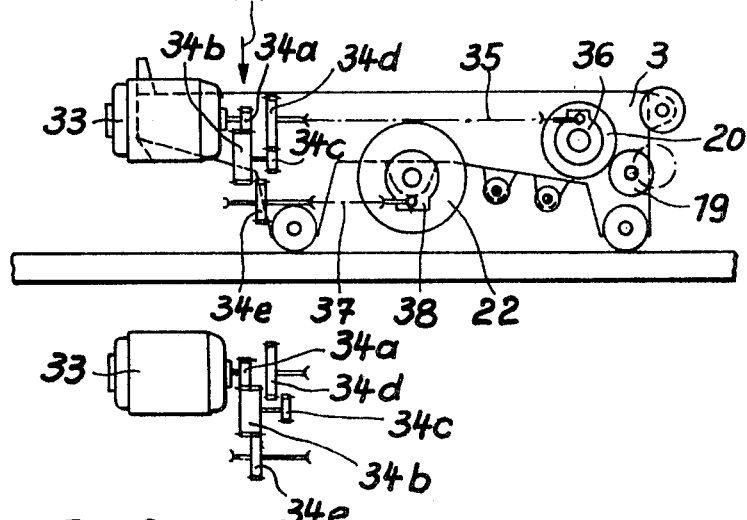

3,581,340
CALENDERS, PARTICULARLY IN DRAWING
CALENDERS FOR THE PRODUCTION OF
WEBS OF FOIL OR FILM
Uwe Thieme, Willich, Germany, assignor to Schloemann
Aktiengesellschaft, Dusseldorf, Germany
Filed Nov. 19, 1968, Ser. No. 776,999
Claims priority, application Germany, Nov. 30, 1967,
P 17 29 043.6
Int. Cl. B29d 7/14, 7/24, 9/02
U.S. Cl. 18—2                                6 Claims

ABSTRACT OF THE DISCLOSURE

A calender, particularly a drawing calender for the production of foil webs from rubber or thermoplastic materials, followed by optional racking and embossing means, the racking means and the embossing means each being lodged in a separate carriage capable of travelling between a working position close to the calender and an idle position, the two carriages being mounted one above the other for parallel running, and the lower carriage being provided, at the end adjacent to the calender, with an overhanging bowl which can also serve as a guiding roller.

Figure 1:
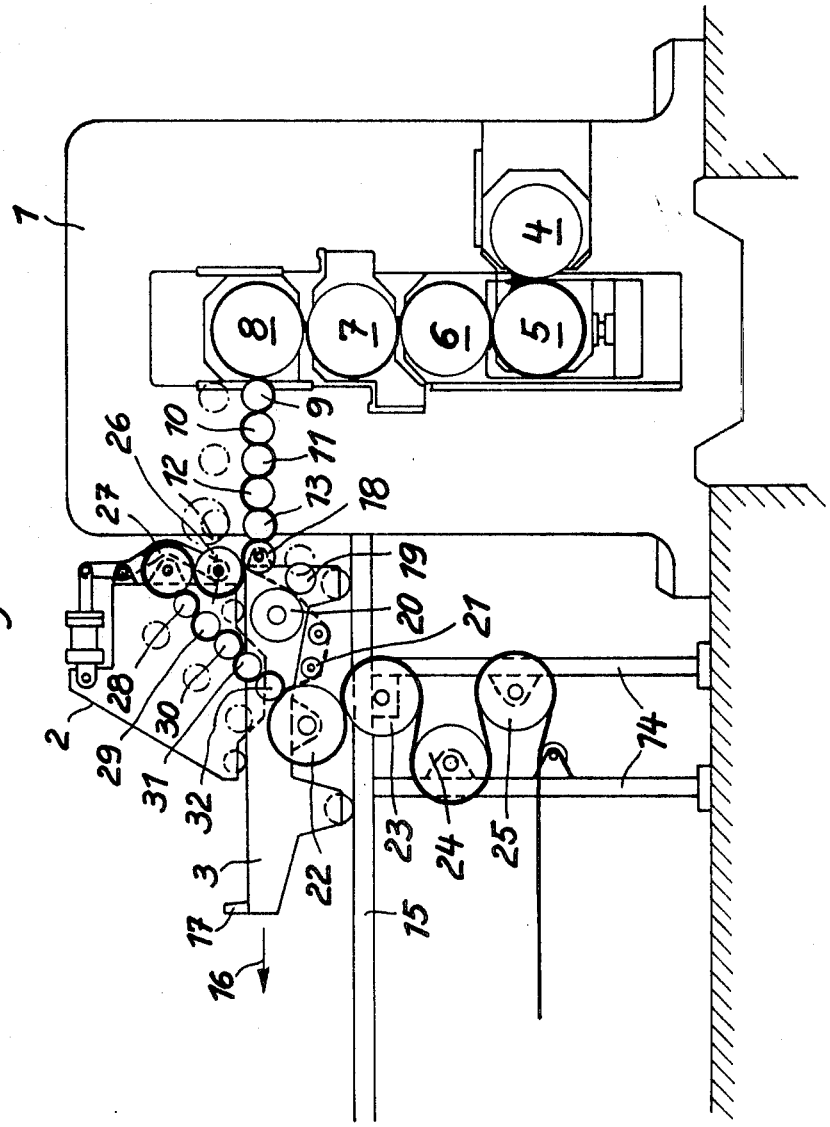

The upper carriage may be mounted upon the lower carriage, for travelling thereon.

---

This invention relates to a calender, particularly a drawing calender for the production of foil or film webs from rubber or thermoplastic materials, with optional means for susequently stretching and/or embossing the foil.

In known calenders for the production of broad-web foils it is known to provide in conjunction with the last calender roll or bowl, a racking or stretching device, mounted in the calender housings themselves, and consisting of a plurality of small bowls or rolls, for the purpose of bringing the foil, drawn out upon the calender, to a still thinner dimension, by longitudinal racking in the plastic region. The foil thus racked out then runs over one or more cooling bowls to the wind-up mechanism. Very frequently, however, the foil is also to be embossed and for this purpose an embossing mechanism formed of an embossing bowl and a resilient counter-pressure bowl is interposed before the cooling rolls, since here the foil still possesses the plasticity necessary for the embossing. If, however, as likewise very frequently occur, a shrinkage foil, serving for instance for packing purposes, is to be produced, the foil, if it is still warm, but in consequence of a partial cooling is no longer in a plastic condition, must run through a second racking device, where it is racked once more, but this time in its resilient or elastic region.

Generally, with such universally laid out calendering arrangements, systems are obtained which can only be regarded as compromise solutions, and which, on account of the multiplicity of the necessary working bowls, require great expenditure in respect of construction and operation, and are mostly complicated, difficult to supervise, and not readily accessible.

The object of this invention is to provide a substantial simplification of such a calendering plant, and this, according to the invention, is attained by lodging the racking device and the embossing device, each as an independent assembly, on a carriage capable of travelling between an idle position and a position located close to the calender housings, the two carriages being arranged vertically one above the other for parallel running, and by arranging, on the lower carriage, at the level of the foil outlet from the calender, a bowl which projects beyond the carriage wall at the calender end of the carriage, and serves at least as a deflecting roller.

By this means not only is the erection of the plant beyond the actual calender simplified, and a good accessibility to the various treatment devices provided, but the change-over times for change of programme are above all also shortened, advantageous safety distances for the drawing-in being at the same time ensured by the travelling of the treatment devices. On the other hand, in the case of treatment devices that have been run into the working position, there are no idle-travel distances or only very short idle-travel distances in the guiding path of the foil, and this likewise is an advantage, since in the conventional arrangements, long idle-travel distances often unavoidably occur, which constitute the main cause of the lateral constrictions of the foil, which are so undesirable.

Further features of the invention will be more fully explained in the course of the description of a constructional example which is diagrammatically illustrated in the accompanying drawings, wherein FIG. 1 is a side elevational view, and FIGS. 2 and 2a show in detail a preferred driving gear arrangement.

In the calender 1, beside the actual calendering bowls or rolls 4 to 8, arranged in L-form, a racking device consisting of bowls 9 to 13 is lodged adjacent to the last calendering bowl 8. This racking device serves to draw out to a still thinner dimension the foil withdrawn from the calender bowls by longitudinal racking in the plastic region. The bowls 9, 11 and 13 are so supported as to be vertically displaceable, and can be moved out upwardly to the positions indicated in the drawings by dot-and-dash circles, in order to obtain a sufficient safety distance from the calender bowl 8, and to enable the foil to be conveniently drawn in.

On that side of the calender from which the racking device issues, rails 15 carried by struts 14 are secured to the calender housings. Upon these rails 15 runs a wheeled carriage 3, which, according to the embodiment illustrated accommodates in itself an embossing device 19, 20. This carriage 3, which is shown in the drawing close up to the calender housings, that is to say, in the working position, can travel in the direction of arrow 16 into an idle position. Furthermore, on the carriage 3 is mounted a further carriage 2, in which for instance a racking device for elastic racking is lodged. The carriage 2 also runs upon wheels, and can travel separately upon the lower carriage 3, between a working position close up to the calender housings, as represented in the drawing, and an idle position, located at an abutment 17.

If the foil drawn out of the calender is now to receive an embossing, the lower carriage 3, after the drawing-in of the fabric web, as illustrated in the drawing, is brought into the working position located at the calender housings, and locked in this position by any convenient means, whilst the upper carriage 2 is run back into the idle position at the abutment 17. In this position of the lower carriage 3, the foil issuing from the racking device of the calender 1 is engaged by a deflecting roll 18 journalled in the lower carriage 3 and projecting beyond the carriage wall at the end of the carriage adjacent to the calender, and is thus guided, as represented in dotted lines in the drawing, into the embossing mechanism consisting of embossing bowls 19 and a resilient counter-pressure bowl 20. The embossing bowl 19 is adjustably journalled in a known manner and on known grounds, and can very easily be displaced towards the front end of the carriage when the lower carriage 3 is retracted. The resilient counter-pressure bowl 20 is also quite readily accessible from above when the upper carriage 2 is retracted. If desired, the embossing and counter-pressure bowls 19 and 20 can be interchanged. From the embossing mechanism the foil runs out over two guide rollers 21 on to the first cooling bowl 22, likewise journalled in the lower carriage 3, from which it runs over the cooling bowls 23, 24 and 25 of a winding apparatus, not shown, mounted in a stationary position on the rails 15 and/or the struts 14.

In the retracted condition of the lower carriage 3, that is, in its idle position the cooling bowl 22, journalled in the lower carriage is also readily accessible, from below. Furthermore, with the lower carriage withdrawn, there are sufficient free spaces for convenient manipulation when drawing in the foil.

If the foil is now, after the plastic racking carried out in the calender, also to undergo in addition a resilient racking, the lower carriage 3, and also the upper carriage 2, are traversed into the working position represented in the drawing, and are both locked in this position. The foil is then drawn off from the calender by the deflecting roll or reversing bowl 18 journalled in the lower carriage and delivered to two tempering bowls 26 and 27 mounted vertically one above the other in the upper carriage 2. To facilitate the drawing-in of the foil, the first tempering bowl 26 is journalled in a manner known in itself on a lever arm, and can for instance be swung out by means of a pneumatic cylinder when the upper carriage is retracted. From the upper tempering bowl 27 the foil runs into the racking device formed by the bowls 28 to 32 for resilient racking, and from there over the first cooling bowl 22 journalled in the lower carriage 3 to the further cooling bowls 23, 24, 25, and to the winding-up appliance. Also in the case of this racking device 28 to 32 journalled in the upper carriage 2 for the resilient racking, the bowls 28, 30 and 32 are capable of being lifted out vertically, as indicated in the drawing by dot-and-dash circles, for the purpose of a convenient drawing in.

With this appliance for lifting out the racking bowls 28, 30 and 32 is coupled a locking device for locking the upper carriage 2 in the working position. A withdrawal of the upper carriage 2 into the idle position at the abutment 17 is hereby permitted only when the bowls 28, 30 and 32 are moved out, so that the bowl 32 cannot collide with the cooling bowl 22 journalled in the lower carriage.

By the arrangement according to the invention the advantage is obtained, amongst others, that the first cooling bowl 22 journalled in the lower carriage is directly subordinated to the last racking bowl 32 of the racking device located in the upper carriage 2 in the working position of the two devices, so that the foil does not need to run through any idle lenght of travel. This renders it possible to use the cooling bowl 22 as a drawing roller for pulling the foil through the racking device located in the upper carriage 2. Thus the large wrapping angle, and the large bearing area associated therewith, of the foil upon the cooling bowl 22, is a great advantage. The racking bowls 28 to 32 are in this case allowed to run free without any drive, whereas the tempering bowls 26 and 27 are switched as braking bowls. For the driving of the cooling bowl 22 serving as a drawing roller there may advantageously be adopted the naturally strong driving motor 33 journalled in the lower carriage, for the embossing device. This motor is therefore provided according to a further development of the invention, with a gear arrangement 34 which renders it possible to switch the driving power selectively either to the embossing device 19, 20 or to the cooling bowl 22. In FIGS. 2 and/or 2a this gear 34 is shown flanged to the carriage wall. Upon insertion of the embossing device 19, 20 the flow of power proceeds from the motor 33 by way of the toothed wheels 34a, 34b, 34c, and 34d, and by way of a cardan shaft 35 and a worm gear 36 to the counter-pressure roll (or bowl) 20, while the cooling bowl 22 is driven by way of a cardan shaft 37 and worm gear 38. Upon insertion of the bowl 22 as a pulling bowl, however, the power of the large and strong motor 33 is transmitted, by changing over the gear 34 (see FIG. 2a), by way of the toothed wheels 34a, 34b and 34e, to the cardan shaft 37, and in this way to the cooling bowl 22. Finally, by this invention, the advantage is also provided of being able to interchange a number of different treatment devices quickly and simply, for both the lower carriage 3 and the upper carriage 2 can accommodate, instead of an embossing device and a racking device treatment devices of any other kind. If desired, one will therefore keep a number of exchangeable carriages ready with different treatment devices. In particular the upper carriage can be very simply lifted by means of cranes, and replaced by another carriage, containing a different treatment device. Such a different treatment device might for instance be a sintering plant, as required in the production of hard foils from PVC with high K values, for instance a luvitherm device. For such a device, the feature that the first cooling bowl 22 journalled in the lower carriage can also be used as a drawing roller is of particular value, since by this means a drive of its own for the treatment device lodged in the upper carriage may be omitted.

I claim:

1. A calender, particularly a drawing calender, for the production of foil webs from rubber and thermoplastic materials, comprising: a plurality of calender rolls, two treatment devices, namely a racking device and an embossing device, each of said treatment devices capable of being selectively included in or excluded from the operation of the machine, and comprising a plurality of working bowls, an upper carriage and a lower carriage, each of said carriages carrying one of said treatment devices, each carriage being independently capable of travelling between a working position adjacent to said calender rolls and an idle position retracted therefrom, said carriages being mounted one above the other for parallel longitudinal movement, and a deflecting roll mounted on said lower carirage and projecting over an end wall thereof adjacent to said calender rolls, at the level at which the foil web being treated leaves the last of said calender rolls, said deflection roll also serving as a guiding roller for the foil.

2. A calender as claimed in claim 1, said upper carriage being mounted upon said lower carriage, and being independently longitudinally movable along said lower carriage.

3. A calender as claimed in claim 1, said racking device being designed for resilient racking, and being mounted in said upper carriage, and the calender also comprising a plurality of tempering bowls, also mounted in said upper carriage, and capable of also serving as braking bowls.

4. A calender as claimed in claim 1, further comprising a first cooling bowl, journalled in said lower carriage.

5. A calender as claimed in claim 4, further comprising a driving motor mounted in said lower carriage, and means for selectively coupling said driving motor either to said first cooling bowl or to the treatment device mounted in said lower carriage.

6. A calender as claimed in claim 5, said first cooling bowl, mounted in said lower carriage, being directly subordinated to the last of said working bowls of the treatment device mounted in said upper carirage, and said upper carriage, and said first cooling bowl, when positively driven by said driving motor, functioning as a drawing roller for drawing the foil web being treated through the treatment device mounted in said upper carriage.

References Cited

UNITED STATES PATENTS

| | | | |
|---|---|---|---|
| 2,236,214 | 3/1941 | Jones | 18—2(C)X |
| 2,308,040 | 1/1943 | Anderson | 18—2(C) |
| 2,898,873 | 8/1959 | Cale | 18—11X |
| 3,107,394 | 10/1963 | Varon | 18—10 |
| 3,243,844 | 4/1966 | Nash | 18—10X |
| 3,346,913 | 10/1967 | Lake et al. | 18—2(C) |

J. SPENCER OVERHOLSER, Primary Examiner

R. L. SPICER, JR., Assistant Examiner

U.S. Cl. X.R.

18—10